(12) United States Patent
Verderber

(10) Patent No.: US 11,639,541 B1
(45) Date of Patent: May 2, 2023

(54) METHODS AND SYSTEMS FOR EXTRACTING MATERIALS FROM FLY ASH

(71) Applicant: Gregory Rudolph Verderber, Cincinnati, OH (US)

(72) Inventor: Gregory Rudolph Verderber, Cincinnati, OH (US)

( * ) Notice: Subject to any disclaimer, the term of this patent is extended or adjusted under 35 U.S.C. 154(b) by 157 days.

(21) Appl. No.: 17/193,028

(22) Filed: Mar. 5, 2021

Related U.S. Application Data

(63) Continuation of application No. 16/116,278, filed on Aug. 29, 2018, now Pat. No. 10,968,500.

(60) Provisional application No. 62/659,926, filed on Apr. 19, 2018, provisional application No. 62/591,937, filed on Nov. 29, 2017, provisional application No. 62/552,591, filed on Aug. 31, 2017.

(51) Int. Cl.
*C22B 59/00* (2006.01)
*C22B 7/02* (2006.01)
*C22B 7/00* (2006.01)

(52) U.S. Cl.
CPC .............. *C22B 59/00* (2013.01); *C22B 7/007* (2013.01); *C22B 7/02* (2013.01)

(58) Field of Classification Search
CPC ............ C22B 7/02; C22B 7/007; C22B 59/00
USPC ......................................................... 423/21.1
See application file for complete search history.

(56) References Cited

U.S. PATENT DOCUMENTS

| | | | |
|---|---|---|---|
| 7,648,643 B1 * | 1/2010 | Creasey | C22B 3/165 |
| | | | 252/183.11 |
| 2013/0175223 A1 * | 7/2013 | Rennard | C02F 11/121 |
| | | | 210/710 |

* cited by examiner

*Primary Examiner* — Anita Nassiri-Motlagh
(74) *Attorney, Agent, or Firm* — Ulmer & Berne LLP

(57) ABSTRACT

When coal is combusted, such as in the process of generating electricity, fly ash is produced in abundant quantities. Methods and systems are provided for extracting materials, such as rare earth elements critical for national security or nuclear power generation, from fly ash. A method of processing fly ash includes installing a collection system in a fly ash pond. The method further includes applying water to the top surface of the fly ash pond, such that the water leaches through fly ash and into the collection system. The leached water is processed to remove materials, such as rare earth elements. Systems are also provided.

24 Claims, 6 Drawing Sheets

METHODS AND SYSTEMS FOR EXTRACTING MATERIALS FROM FLY ASH

REFERENCE TO RELATED APPLICATIONS

This application is a continuation of U.S. patent application Ser. No. 16/116,278, filed Aug. 29, 2018, which claims priority of U.S. provisional patent application Ser. Nos. 62/552,591, 62/591,937, and 62/659,926, filed Aug. 31, 2017, Nov. 29, 2017, and Apr. 19, 2018, respectively, and hereby incorporates each of these patent applications by reference herein in its respective entirety.

TECHNICAL FIELD

The present disclosure relates to methods and systems for extracting materials, such as rare earth elements critical for national security and/or nuclear power generation, from coal fly ash.

BACKGROUND

When coal is combusted, such as in the process of generating electricity, fly ash is produced in abundant quantities.

SUMMARY

In accordance with one embodiment, a method is provided for processing fly ash. The method includes burying a collection system at a first depth beneath a top surface of a fly ash pond. The collection system includes a plurality of spaced laterals coupled with an outlet. The method further includes applying water to the top surface of the fly ash pond, above the spaced laterals, such that the water leaches through fly ash and into the collection system. The method also includes receiving and processing leached water from the outlet to remove materials such as rare earth elements.

BRIEF DESCRIPTION OF THE DRAWINGS

It is believed that the disclosed methods and systems will be better understood from the following description taken in conjunction with the accompanying drawings in which.

DETAILED DESCRIPTION

Figure 1:
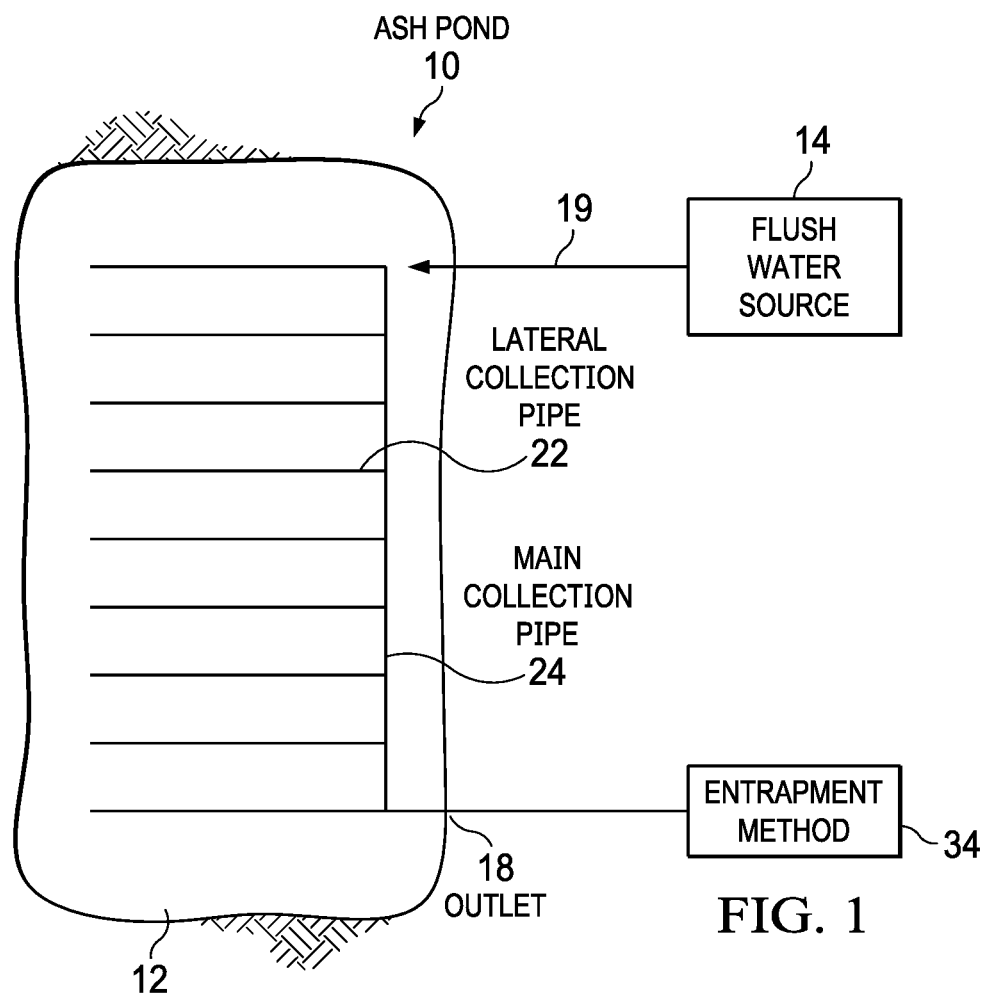
FIG. 1. depicts a system comprising an ash pond containing fly ash, a flush water source, a method to deliver flush water to the fly ash, a method to collect flush water percolated through the fly ash, and a method to entrap materials leached from the fly ash.

The United States is dependent upon other countries to supply rare-earth elements (REEs) that are critical to our national defense. Rare earth elements are essential to many high-tech devices including cellular telephones, computer hard drives, electric and hybrid vehicles, flat-screen monitors and televisions. Significant national defense applications of REEs include communications systems, electronic displays, guidance systems, lasers, radar and sonar systems. It is a matter of national security for the United States to identify alternative sources of defense-critical REEs within U.S. borders that are produced by U.S. controlled companies. As just one example, the rare earth element thorium can be used as a nuclear fuel in place of uranium. A thorium reactor, called a molten salt reactor, can be considered inherently safer than a light water reactor using uranium as a nuclear fuel, and can be a better all-around nuclear fuel option. (See technology pioneered by Alvin Weinberg at the Oak Ridge National Laboratory).

Methods and systems for extracting valuable materials from fly ash, including but not limited to REEs critical to national security, the nuclear fuel thorium, and a variety of other useful materials, are discussed herein in Section 1. Methods and systems for removing pollutants from coal fly ash, creating an anthropogenic soil, and beneficially using coal fly ash, are discussed herein in Section 2. It is understood that Sections 1 and 2 each fully describe methods and systems of extracting materials from coal fly ash and that there is significant overlap between the Sections. However, it is further understood that the methods and systems disclosed in Sections 1 or 2 may be applicable in extracting materials discussed in another Section and their disclosure in one Section is not intended to limit their use for the purpose or extraction of any specific material described in either Section. For example, the disclosure of a method or system of using plants to remove pollutants from fly ash under the heading Phytoremediation in Section 2 is not intended to exclude the possibility of using plants to remove rare earth elements from fly ash as discussed in Section 1.

For the purpose of promoting and understanding the principles of selected embodiments, specific language will be used. It will nevertheless be understood that no limitation of scope is thereby intended, and such alterations and further modifications of the principles, and such further applications of the principles as illustrated therein, are each herein contemplated as would normally occur to one skilled in the art.

As used herein, the term rare earth elements (REEs) includes, for example, a set of seventeen metallic elements including the fifteen lanthanides on the periodic table plus scandium, yttrium and thorium. Pollutant includes, for example, elements including but not limited to arsenic, barium, beryllium, boron, cadmium, chromium, thallium, selenium, molybdenum and mercury. Fly ash refers to, for example, a coal combustion product composed of particulates that are driven out of coal-fired boilers together with the flue gases. Entrapment includes, for example, extracting REEs or other materials. Flush water includes, for example, water or another suitable liquid that can be percolated through fly ash, including for example any water already expounded in a fly ash pond. Flushing includes, for example, percolating quantities of liquid through fly ash. Leaching includes, for example, the removal of soluble material from a substance, such as fly ash, through the percolation of a liquid through that substance.

The systems and methods disclosed herein will be better appreciated with reference to the schematic drawings of FIGS. 1-7.

Section 1—Extracting Rare Earth Metals from Coal Fly Ash

Coal fly ash shows the potential to supply REEs necessary in certain high-tech and defense applications. Coal mined in certain areas of the United States has proven to contain relatively high concentrations of REEs. Burning that coal in a power plant further concentrates REEs in the remaining fly ash. As a result, fly ash can have significant concentrations of REEs that are more than ten times that of unburned coal.

Efforts to extract REEs from fly ash have generally employed lab scale processes that are difficult and/or prohibitively expensive to implement at a scale necessary to extract commercially meaningful volumes of REEs.

Disclosed herein are methods of extracting rare earth elements (REEs) from coal fly ash. Selected embodiments are hereinafter described that utilize an existing fly ash pond as part of a method and system to extract REEs from fly ash, such as to meet the demand for REEs in high-tech and defense applications. Leaching REEs at a power plant in an existing ash pond as described herein leverages scale (the large size of a fly ash pond), and the ability to recycle flush water through fly ash innumerable times, to provide economically efficient methods and systems for REE extraction.

Leaching REEs by Percolating Water through Fly Ash in an Existing Ash Pond

As shown in FIG. 1, one embodiment includes an ash pond 10 containing fly ash 12, a flush water source 14, a flush water collection system leading to an outlet 18, and a method and system for extracting REEs from flush water once it exits the ash pond 10 through the outlet 18.

The ash pond 10 can be an existing ash pond constructed at a coal fired power plant, which often is an artificial body of water into which the fly ash 12 is placed. The ash pond 10 can be generally bowl shaped and can generally have a flat bottom and steep banks.

After partially dewatering an existing ash pond 10, the fly ash 12 can be leveled using mechanical equipment such as a bulldozer, grader or a screed, or other suitable method. Flush water can be piped from a flush water source 14 to the ash pond 10. A flush water collection system can be installed in the ash pond 10 such that flush water piped to the ash pond 10 percolates through the fly ash 12 and is collected by the collection system and is directed to the outlet 18. In other embodiments, it will be appreciated that dewatering and/or leveling may not be necessary, in which case a flush water collection system can be installed into the ash pond 10 without any significant prior preparation of the ash pond 10.

Figure 2:
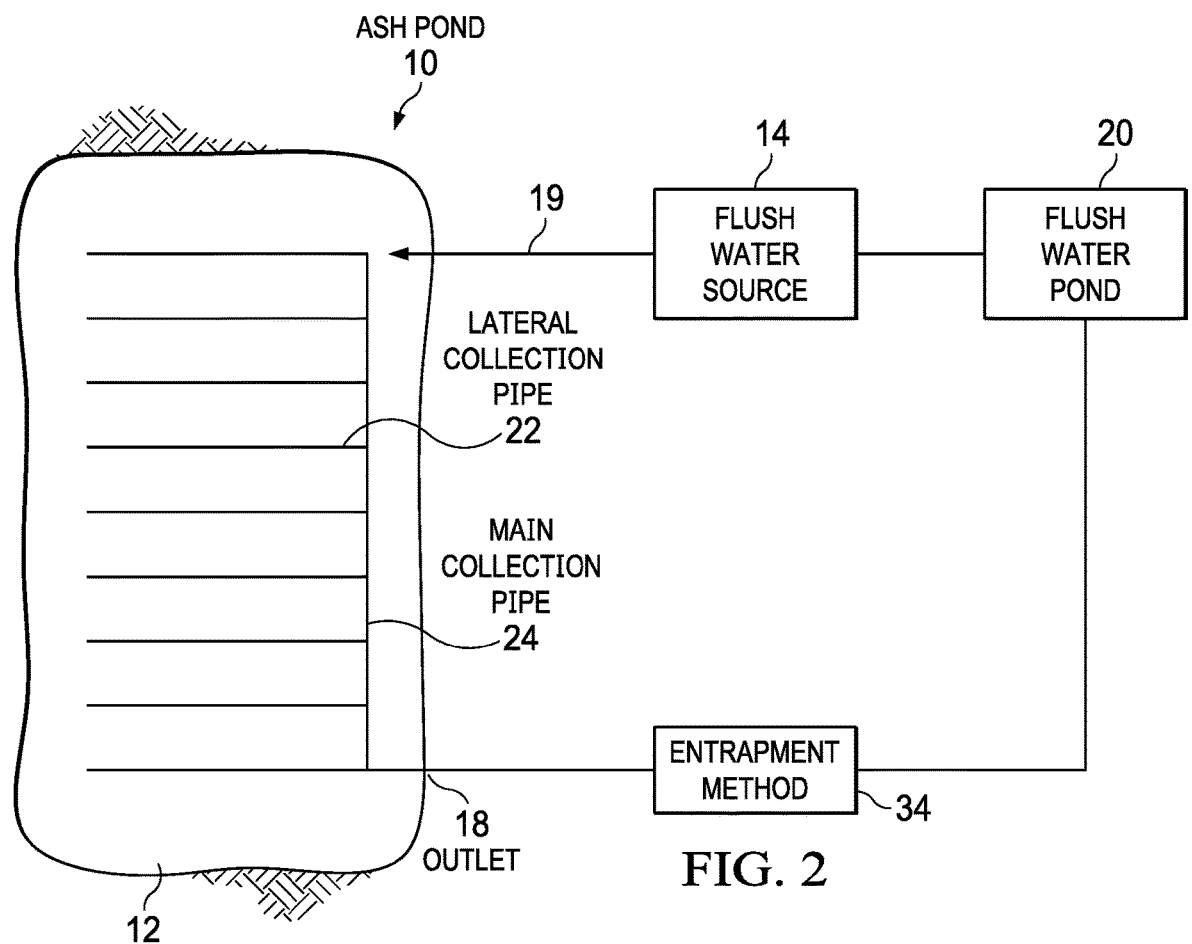
FIG. 2. depicts a system comprising an ash pond containing fly ash, a flush water pond and a supplemental flush water source, a method to deliver flush water to the fly ash, a method to collect flush water percolated through the fly ash having an outlet, and a method to entrap materials leached from the fly ash.

As shown in FIG. 2, a separate flush water pond 20 can provide a source of flush water. In this configuration, the flush water source 14, if provided, can comprise a well or other water source that can serve to supplement flush water obtained from the flush water pond 20.

Figure 5:
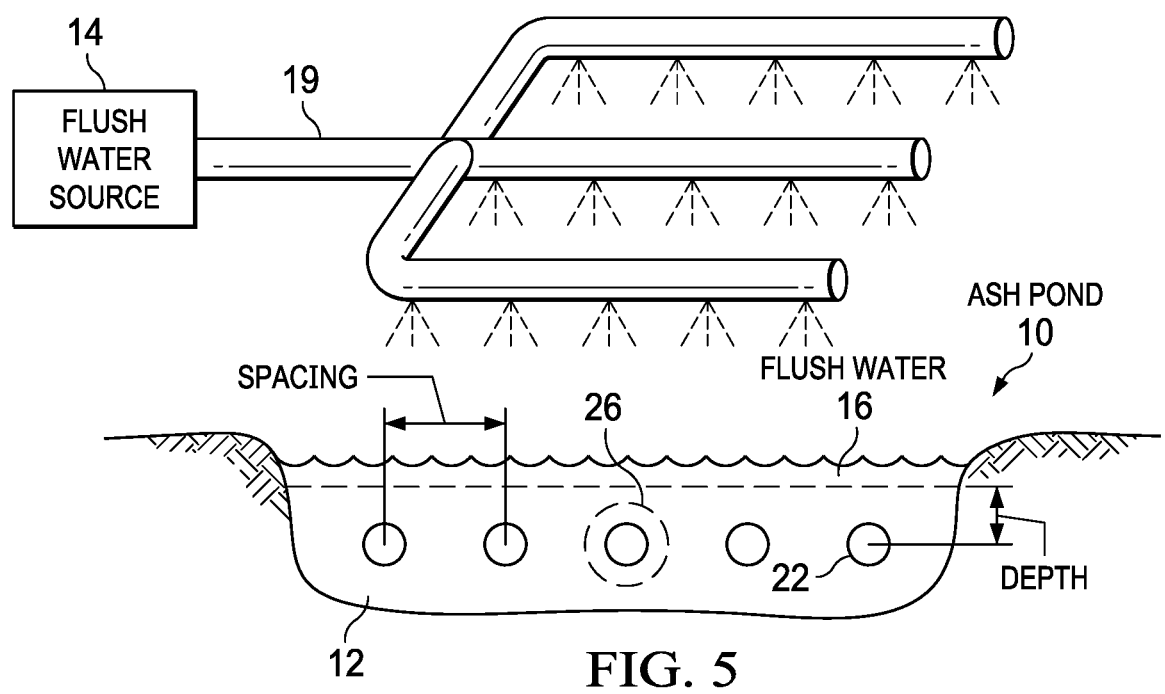
FIG. 5. is a cross section depicting a flush water delivery method and flush water collection method showing delivery pipes above the surface of the fly ash and collection pipes within the fly ash.

In each of the embodiments of FIG. 1 and FIG. 2, a flush water delivery pipe 19 can be provided to facilitate transfer of flush water from the flush water source 14 and/or the separate flush water pond 20 to the ash pond 10. In other embodiments, multiple such flush water delivery pipes can be provided within a particular system. Flush water can be pumped, or alternatively flow by gravity, through the flush water delivery pipe 19 to the ash pond 10. The ash pond 10 can simply be flooded with flush water (see e.g., FIG. 6), or in another embodiment, a method or system can be provided to more evenly distribute flush water over the surface of the ash pond 10 (see e.g., FIG. 5). For example, as shown in FIG. 5, a matrix of pipes provided on or above the surface of the ash pond 10 can drip or spray flush water generally evenly over the surface of the ash pond 10. As another example, an agricultural type irrigation system such as a center pivot irrigation system may be provided to generally evenly distribute flush water over the surface of the ash pond 10.

Flush water distributed over the ash pond 10 percolates through the fly ash 12 and can leach REEs from the fly ash 12. It will be appreciated that, in one embodiment, even distribution of flush water over the ash pond 10 can facilitate more effective leaching of pollutants from the fly ash 12. It will be appreciated that, in another embodiment, flooding the pond with flush water can facilitate more effective leaching of REEs from the fly ash 12.

Figure 3:
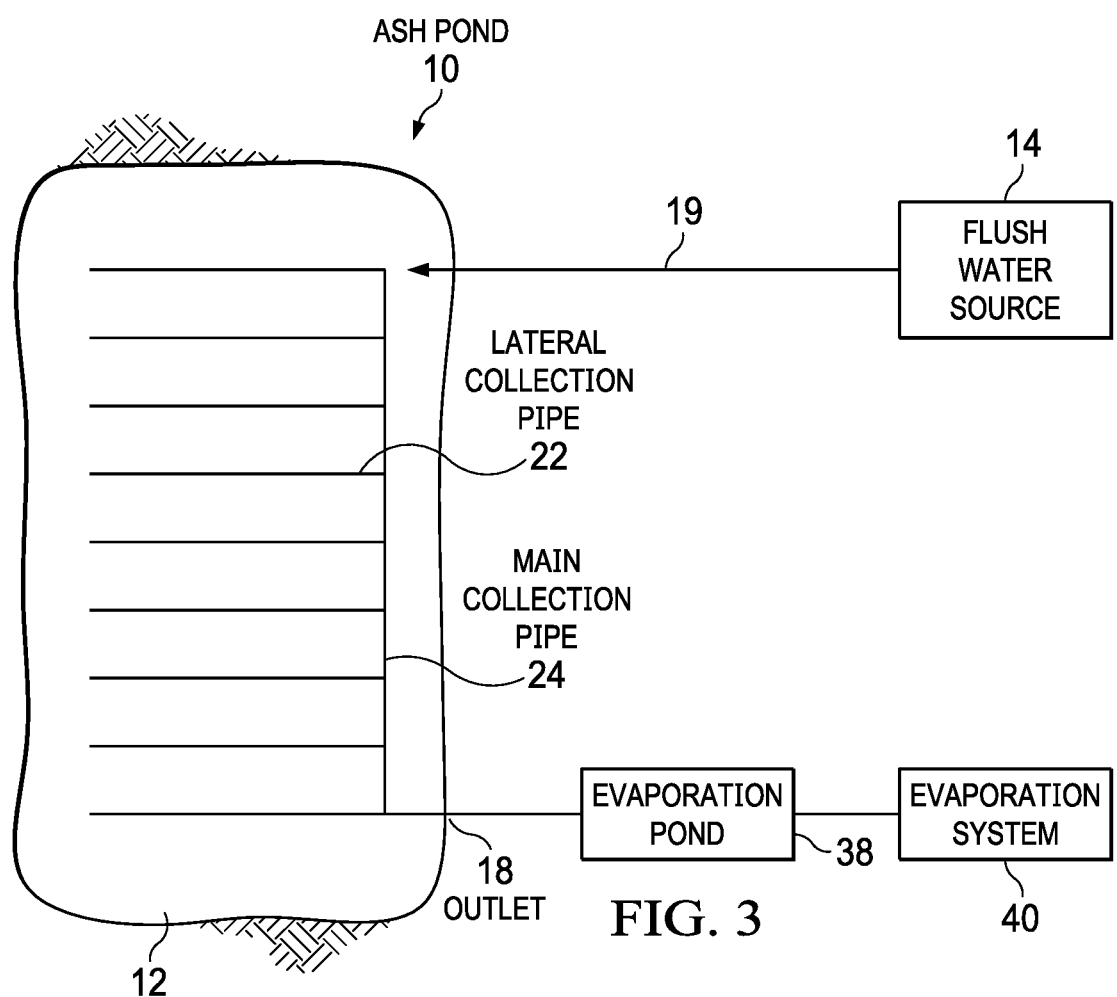
FIG. 3. depicts a system comprising an ash pond containing fly ash, a flush water source, a method to deliver flush water to the fly ash, and a method to collect flush water percolated through the fly ash having an outlet and an evaporation pond.
Figure 4:
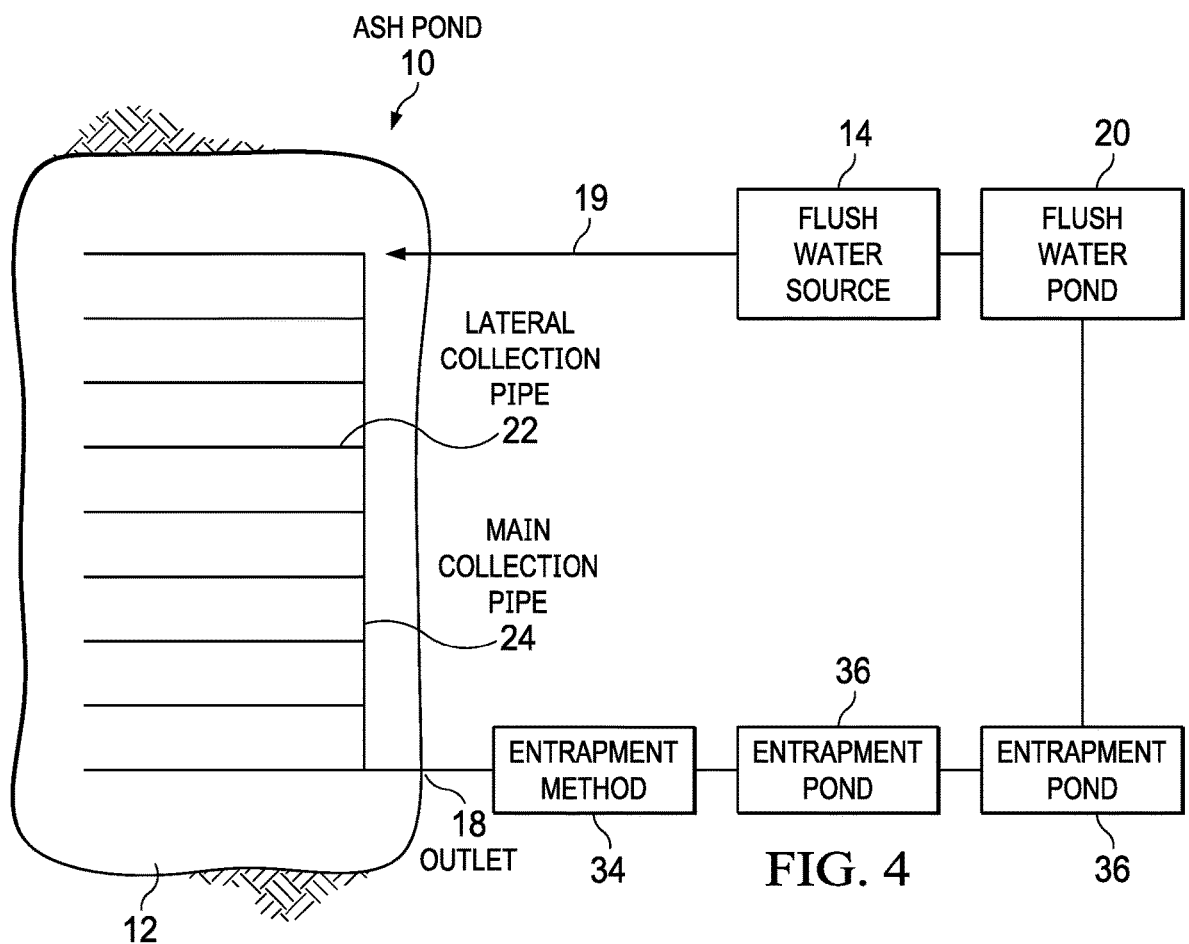
FIG. 4. depicts a system comprising an ash pond containing fly ash, a flush water pond, a supplemental flush water source, a method to deliver flush water to the fly ash, a method to collect flush water having an outlet, a method to entrap materials leached from the fly ash as flush water exits the outlet, and a series of entrapment ponds each employing a method or methods to entrap materials leached from the fly ash.

In one embodiment, flush water can be collected by a system of pipes placed horizontally at an appropriate depth within the fly ash 12. For example, as shown in FIG. 3, a matrix of lateral pipes, or laterals 22, can be employed to collect the flush water and main pipes, or mains 24 can be employed to deliver the flush water from the laterals 22 to the outlet 18. Laterals 22 and/or mains 24 can be formed from corrugated, flexible, and perforated plastic pipe having a generally circular cross section. Alternatively, laterals 22 and/or mains 24 can be formed from smooth plastic, concrete, terra cotta, stainless steel or any other suitable material. In one embodiment, laterals 22 can be wrapped with filter material 26 (see FIG. 5) to prevent the entry of fly ash 12 as flush water (shown as 16) is collected by the laterals 22. Discharge through the outlet 18 may take place entirely by gravity or by pumping through the outlet 18.

Laterals 22 and mains 24 can be placed at a suitable depth in the fly ash 12, as for example about two to about fifty feet. Laterals 22 can be sloped toward and empty into the mains 24, and mains 24 can be sloped toward the outlet 18. Laterals 22 can be generally parallel with one another and as a practical matter can be spaced at between about 10 feet and about 200 feet apart from one another such as depending upon the permeability of the fly ash 12 and/or other factors. Laterals 22 can be placed closer for less permeable ash and farther apart when the ash is more permeable. The horizontal collection system described above can be installed by directional drilling or using deep one-pass trenching technology or any other suitable method.

Figure 6:
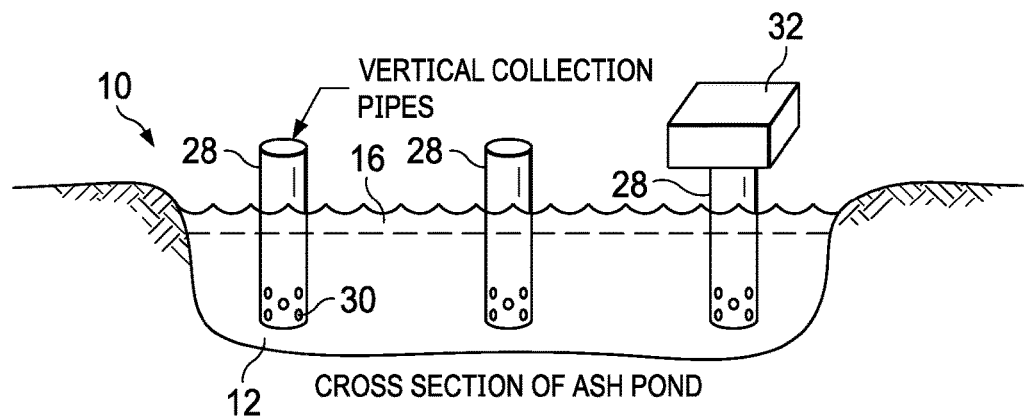
FIG. 6. depicts a system of vertical collection pipes in a fly ash pond.

Another embodiment is a collection system that includes vertical, as opposed to horizontal, pipes. As shown in FIG. 6, this embodiment can employ one or more vertical pipes 28 each having a length generally corresponding to the full depth of the ash pond 10, and with each pipe having perforations 30 at its lower terminal end. In one embodiment, a filter material (e.g., similar to 26 described above) can be provided over the perforations 30. The vertical pipes 28 can be placed vertically in the fly ash 12 so that, in one example, the perforated terminal ends of the vertical pipes 28 are at or near the bottom of the ash pond 10. It will be appreciated that, in alternative embodiments, vertical pipes within a particular collection system can extend to varying depths within an ash pond, and/or some or all of the vertical pipes might not extend to near the bottom of the ash pond.

To facilitate installation of each of the vertical pipes 28 into the ash pond 10, a source of pressurized water can be supplied to the upper proximal end of the vertical pipe such that the pressurized water will exit the perforated terminal end of the pipe and displace fly ash 12 such that the pipe can easily be inserted into the fly ash 12. Alternatively, holes can be drilled into the fly ash, into which the vertical pipes 28 can be respectively installed.

Once the vertical pipe or pipes 28 are installed, flush water (shown as 16 in FIG. 6) can percolate through the fly ash 12 and then enter the vertical pipe or pipes 28 through the perforations 30 at the terminal end. A pump (e.g., 32, shown connected to one of the vertical pipes) can be provided such that flush water can then be pumped from each of the vertical pipes 28. It will be appreciated that an advantage of a vertical system is that, in some circumstances, it may be easier to install vertical pipes 28 rather than horizontal pipes, and slope of pipes within the system need not be as closely considered in a vertical system as in a horizontal system. However, a vertical collection system can disadvantageously require pumping of water from each vertical pipe. It will be appreciated that, in other embodiments, a system can employ both horizontally and vertically arranged collection pipes.

Regardless of whether the pipes of a collection system are vertically and/or horizontally arranged, flush water percolated through the fly ash 12 can dissolve or leach REEs out of the fly ash 12. REEs leached from the fly ash 12 can be selectively entrapped using an entrapment method 34 (see e.g., FIG. 1) as flush water exits the outlet 18, and/or can be entrapped in one or more sluices or entrapments ponds 36 (see e.g., FIG. 5) before the flush water enters a flush water pond 20 designed to store flush water to be redistributed over the fly ash 12, or is instead recycled directly for reapplication to the ash pond 10. It will be appreciated that, the length of time that flush water is in contact with the fly ash 12 and/or the number of times the flush water is percolated through the fly ash 12 can affect the amount of REEs leached from the fly ash 12.

In one embodiment, a system or method for removing REEs from flush water can be provided at the outlet 18. For example, suitable systems or methods for removing REEs can include but are not limited to precipitation, ultrafiltration, membrane bioreactors and/or reverse osmosis, adsorption, solvent extraction, ion exchange, nanocomposites, and/or bio-extraction by certain microorganisms.

In another embodiment, the entrapment ponds 36 can include a method or system to entrap REEs. For example, deacidification of the flush water in one or more intermediate ponds can cause REEs that are less soluble in acid solution to precipitate out of solution so that they can be more easily entrapped. It will be appreciated that, in some embodiments, several or many entrapment ponds can be provided (e.g., two shown in FIG. 4), such that the flush water can be sequentially processed through each of them, wherein the same or differing entrapment methods or steps may be performed in each such entrapment pond. An entrapment pond can include an open-air type pond, or can alternatively include a tank or other open or closed type vessel.

In one embodiment, adsorption materials including but not limited to carbon can be introduced into the flush water in an entrapment pond to adsorb pollutants. Additionally or alternatively, a precipitation reagent can be added to the flush water in an entrapment pond, resulting in a chemical reaction that converts pollutants into solid particles which can be aggregated by chemical coagulation and removed by filtration or sedimentation. Additionally or alternatively, ion exchange can be used in an entrapment pond to facilitate a chemical reaction in which ions in the flush water are exchanged for similarly charged ions attached to solid particles.

Enhancing the Leaching Process

Each successive flushing cycle can leach some REEs from the fly ash 12. Flushing cycles can be repeated indefinitely until economical or meaningful levels of REEs can no longer be leached from the fly ash 12.

In one embodiment, flush water can be continuously percolated through the fly ash 12. In another embodiment, the fly ash 12 can be saturated with flush water and the flush water can be allowed to remain in contact with the fly ash 12 for a period of time, to enhance the leaching of REEs, prior to entering the collection system. For example, in one embodiment, the outlet 18 can be selectively blocked, e.g., with a valve (not shown), to ensure a desired amount of time of contact of the flush water with the fly ash 12. While only a single outlet is shown, it will be appreciated that a method or system in accordance with the present disclosure can alternatively include a plurality of outlets.

In one embodiment, flush water can be treated to enhance the leaching process. For example, when flush water is acidified, REEs that are more soluble in an acid solution can be more readily leached from the fly ash 12. As another example, when flush water is made less acidic, REEs that are more soluble in an alkaline solution can be more readily leached from the fly ash 12. Other leaching agents or solvents can be added to flush water to aid in the dissolution of specific REEs. In other examples, the flush water can be another suitable liquid instead of water such as, for example, ionic liquids which can be used leach REEs from fly ash.

In one embodiment, the fly ash can 12 be agitated to enhance the leaching process. For example, the fly ash 12 can be tilled and then flooded with flush water. In this example, tilling can break up ash clumps, and troughs and ridges in the ash that result from tillage can increase surface contact between flush water and the fly ash 12 and correspondingly increase the efficiency of the flushing process. In another example, the ash pond 10 can be flooded and the fly ash 12 can then be agitated to create a suspension of fly ash 12 within the ash pond 10. This latter example can greatly increase surface contact between flush water and the fly ash 12, and therefore can further increase the efficiency of the flushing process.

Concentrating REEs in Flush Water to Enhance the Extraction Process

Higher concentrations of REEs can in some circumstances be easier to remove from flush water. It will be therefore be appreciated that, in some embodiments, flush water can be recirculated through the fly ash 12 without removing REEs, and that each cycle can leach an additional fraction of REEs from the fly ash 12 up to a saturation point, thereby concentrating REEs in the flush water to facilitate more efficient or effective extraction of the REEs from the flush water. If the concentration of REEs in flush water remains too low for efficient or effective extraction after repeated cycles, the concentration of REEs can be increased through any of a variety of suitable processes, such as evaporation. Evaporation can be passive, as for example in an evaporation pond where solar energy causes flush water to vaporize. Alternatively, REEs can be actively concentrated in flush water by active evaporation, such as through distillation in an evaporation system.

Leaching REEs in a Capped Fly Ash Pond

Another embodiment relates to fly ash ponds 10 which are capped in place. Fly ash ponds 10 are typically capped using layers of compacted clay and/or geotextile materials in an effort to prevent water intrusion and subsequent leaching of pollutants into groundwater.

In this embodiment, a water collection system, as more fully described above, can be installed in an existing fly ash pond (e.g., 10) before or after the pond is capped in place. For example, laterals 22 and mains 24 can be placed generally horizontally by directional drilling, vertical pipes 28 can be driven into the fly ash 12, or collection pipes can be placed in any other suitable orientation by any other suitable method.

In this embodiment, flush water can be supplied to the upper layers of fly ash 12 within a capped fly ash pond so that the flush water percolates through the fly ash 12 and is collected by the collection system. Flush water collected in this embodiment can be treated to extract REEs, as more fully described above, prior to recycling or release.

Providing for Leaching of REEs When a Fly Ash Pond is Constructed

In another embodiment, a flush water collection system as described herein can be installed in a fly ash pond (e.g., 10) during pond construction. In this embodiment, collection pipes can be placed at the bottom of the ash pond 10, just above the base of the pond or just above the pond liner, and/or in any of a variety of other suitable configurations.

Leaching Other Valuable Material by Percolating Flush Water through Fly Ash

Coal fly ash 12 can contain significant levels of valuable materials in addition to REEs. In this embodiment, valuable materials can be leached from fly ash 12 in essentially the same way that REEs are leached from fly ash 12 as more fully described above. Flush water can be delivered to the surface of the ash pond 10, which can range in size from less than 10 acres to more than 500 acres. The flush water percolates through the fly ash 12 and enters a collection system as more fully described above. Valuable materials are then removed from flush water exiting the collection system, such as in one or more intermediate ponds, and the flush water can then be returned to the surface of the ash pond 10 for as many cycles as is appropriate to remove the desired amount of valuable materials from the fly ash 12.

As described above, flush water may be treated to enhance the leaching process. For example, certain materials may be more soluble in acid solution or basic solution. In this embodiment, flush water can be acidified to remove elements or compounds that are more soluble in an acid solution, and/or flush water can be made more basic to remove elements or compounds that are more soluble in basic solution. Leaching agents or solvents can be added to flush water to enhance the removal of valuable materials.

As discussed above, higher concentrations of valuable materials can be easier to remove from flush water. Methods of concentrating other valuable materials in flush water include but are not limited to recirculating flush water through the fly ash 12 without removing materials from the flush water, with each cycle removing an additional fraction of materials from the ash up 12 to the saturation point of the flush water, thereby concentrating materials in the flush water to facilitate more efficient or effective extraction or entrapment. If the concentration of materials in the flush water remains too low to facilitate efficient or effective extraction or entrapment after repeated cycles, the concentration of materials can be further increased through any number of suitable processes, such as evaporation. In this embodiment, the flush water can be exposed to one or more evaporative processes to create a concentrated solution of materials which may be more efficiently or effectively extracted or entrapped.

Section 2—Leaching Pollutants by Percolating Water through Fly Ash

Coal contains varying levels of toxic elements including arsenic, barium, beryllium, boron, cadmium, chromium, thallium, selenium, molybdenum and mercury. Coal combustion concentrates these toxic elements in the resulting fly ash. When fly ash is stored in ponds at a coal power plant, it poses a risk to groundwater. Therefore, fly ash is largely considered a waste material that is extremely expensive to dispose of. For example, transporting and landfilling fly ash from a single medium sized coal fired power plant operating since the 1960s can exceed $50 million. Methods of efficiently leaching pollutants from fly ash in an existing fly ash pond described herein can allow companies to avoid the significant costs associated with transporting and landfilling fly ash, and can preserve thousands of acres that would otherwise be required to landfill fly ash.

Referring again to FIG. 1, one embodiment includes the ash pond 10 containing fly ash 12, a source of water to flush the fly ash 12, a flush water collection system leading to the outlet 18, and a method of treating flush water leaving the outlet 18 to entrap pollutants leached from the fly ash 12.

The ash pond 10 can be an existing ash pond constructed at a coal fired power plant, which is an artificial body of water into which coal ash 12 is placed. The ash pond 10 can be generally bowl shaped and can generally have a flat bottom and steep banks.

After partially dewatering an existing fly ash pond (e.g., 10), the fly ash 12 can be leveled using mechanical equipment such as a bulldozer, grader or a screed, or other suitable method. Flush water can be piped through the flush water delivery pipe 19 from the flush water source 14 to the ash pond 10. A flush water collection system can be installed in the ash pond 10 such that flush water piped to the ash pond 10 percolates through the fly ash 12 and is collected by the collection system and is directed to the outlet 18. In other embodiments, it will be appreciated that dewatering and/or leveling might not occur, in which case a flush water system can be installed in the ash pond 10 without any significant prior preparation of the ash pond 10.

As noted above, the flush water pond 20 and/or the flush water source 14, such as a well to provide supplemental flush water source, can provide a source of flush water. The flush water delivery pipe 19 can be provided to facilitate the flow of water therefrom to the ash pond 10. Flush water 12 can be pumped, or alternatively flows by gravity, through the flush water delivery pipe 19 to the ash pond 10. The ash pond 10 can simply be flooded with flush water, or in another embodiment, a system can be provided to more evenly distribute flush water over the surface of the ash pond 10. For example, a matrix of delivery pipes provided on or above the surface of the ash pond 10 can drip or spray flush water generally evenly over the surface of the ash pond 10. As another example, an agricultural type irrigation system such as a center pivot irrigation system can be provided to generally evenly distribute flush water over the surface of the ash pond 10. Flush water distributed over the ash pond 10 can percolate through the fly ash 12 and leach pollutants from the fly ash 12. It will be appreciated that, in one embodiment, even distribution of flush water over the ash pond 10 can facilitate more effective leaching of certain pollutants from the fly ash 12.

In one embodiment, flush water can be collected by a system of pipes placed horizontally at an appropriate depth within the fly ash. For example, a matrix of lateral pipes or laterals (e.g., 22) can be employed to collect the flush water and main pipes or mains (e.g., 24) can be employed to deliver the flush water from the lateral pipes to the outlet 18. Laterals 22 and/or mains 24 can be formed from corrugated, flexible, and perforated plastic pipe having a generally circular cross section. Alternatively, laterals 22 and/or mains 24 can be formed from smooth plastic, concrete, terra cotta or any other suitable material. In one embodiment, laterals 22 can be wrapped with filter material (26 in FIG. 5) to prevent the entry of fly ash 12. Discharge through the outlet 18 can take place entirely by gravity or by pumping flush water through the outlet.

Laterals 22 and mains 24 can be placed at a suitable depth in fly ash 12, as for example about two to about twenty-five feet, as will be appreciated with reference to FIG. 5. Laterals 22 can be sloped toward and empty into the mains 24, and mains 24 can be sloped toward and empty into an outlet 18. Also as will be appreciated with reference to FIG. 5, laterals 22 can be generally parallel and as a practical matter can be spaced at between about 10 feet and about 200 feet apart from one another. The spacing of laterals 22 from one another can be selected based upon a variety of factors, such as depending upon the permeability of the fly ash 12, which can be measured in a laboratory. Laterals 22 can be placed closer for less permeable fly ash and farther apart when fly ash is more permeable. A horizontal collection system having laterals 22, mains 24 and an outlet 18 can be installed by directional drilling or deep one-pass trenching or any other suitable method.

Another embodiment includes a collection system having vertical pipes, as opposed to horizontal pipes. Referring to FIG. 6, this embodiment can employ one or more generally vertical pipes 28 having a length roughly corresponding to the depth of the ash pond 10, and with each of the vertical pipes having perforations 30 at its terminal end. The vertical pipes 28 can be placed vertically in the fly ash 12 so that, in one example, the perforated terminal end of each of the vertical pipes 28 is at or near the bottom of the ash pond 10. However, in other embodiments, perforated ends of one or more vertical pipes of a collection system might extend to a depth significantly less than the full depth of an ash pond.

To facilitate installation of the vertical pipes 28 into the ash pond 10, in one example, a source of pressurized water can be supplied to the proximal end of each vertical pipe such that the pressurized water will exit the perforated terminal end of the pipe and displace fly ash 12 as the vertical pipe is inserted into the ash pond 10. Once installed and in use, flush water percolated through the fly ash 12 can enter each of the vertical pipes 28 through the perforations 30 at its distal end. The flush water 12 can then be pumped from the vertical pipes 28. It will be appreciated that an advantage of a vertical system is that it may be easier to install vertical pipes 28 rather than horizontal laterals 22 and mains 24, and the slope of pipes need not be as closely considered in a vertical system as in a horizontal system. However, a vertical collection system can disadvantageously require pumping of water from each pipe and can be more likely than a horizontal collection system to reduce or otherwise negatively interfere with agricultural use of the ash pond 10. It will be appreciated that, in other embodiments, a system can employ both horizontally and vertically arranged pipes. It will be further appreciated that, in some circumstances, a collection system may include only a single vertical pipe (e.g., 28) as its only collector of flush water.

Pollutants leached from the fly ash 12 can be selectively entrapped as flush water exits the outlet 18, or can be entrapped in one or more intermediate ponds, before the flush water enters the flush water pond 20 designed to store flush water to be redistributed over the fly ash 12, or is instead returned directly for reapplication to the ash pond 10. Desirable elements can be allowed to remain in the flush water so that they are recycled to the fly ash 12 in subsequent flushing cycles.

In one embodiment, a method of removing pollutants from flush water is provided at the outlet 18. For example, the entrapment method 34 can include but is not limited to ultrafiltration, membrane bioreactors and/or reverse osmosis capable of removing soluble and/or particulate heavy metals, such as lead, copper, chromium, iron, manganese, mercury, nickel and zinc.

In another embodiment, the entrapment ponds 36 can be provided to entrap pollutants. For example, an oxidizing agent can be introduced into the flush water in an entrapment pond, causing electrons to move from the oxidant to the pollutants, which undergo structural modification and become less destructive. Additionally or alternatively, adsorption materials, including but not limited to carbon, can be introduced into the flush water in an entrapment pond to adsorb pollutants. Additionally or alternatively, a precipitation reagent can be added to the flush water in an entrapment pond, resulting in a chemical reaction that converts pollutants into solid particles which can be aggregated by chemical coagulation and removed by filtration or sedimentation. Additionally or alternatively, ion exchange can be employed in an entrapment pond to facilitate a chemical reaction in which heavy metal ions in the flush water are exchanged for similarly charged ions attached to solid particles.

The above described entrapment methods can be used individually, or in any combination, including together with other entrapment methods not described herein to remove pollutants from flush water. Pollutants can be chemically stabilized or solidified and disposed of in landfills. In the alternative, residue containing high concentrations of pollutants can be purified into marketable products, as for example arsenic, cadmium, chromium, copper, lead, nickel and zinc.

Each successive flush-collect-entrap cycle leaches and entraps some pollutants, and flush-collect-entrap cycles can be repeated indefinitely to reduce pollutants in the fly ash 12 to target levels. Because flush water tends to carry pollutants downward through the fly ash 12, toward the collection system, once tests show that pollutants in the top layer of fly ash 12 have been reduced to acceptable levels, that layer of fly ash 12 can be harvested and sold as an agricultural soil amendment, or blended with material to form an anthropogenic soil as described below, or used for any other acceptable purpose, with reduced or no concern for groundwater contamination.

If a horizontal flush water collection system is placed relatively close to the top surface of the ash pond 10, the laterals 22 and mains 24 will eventually be uncovered as successive layers of fly ash 12 are removed from the ash pond 10. Once the laterals 22 and mains 24 are uncovered or are nearly uncovered, they can be removed and reinstalled, or a new collection system can be installed, at an appropriate depth. This process can be repeated until the laterals 22 and mains 24 are in close proximity to the bottom or base of the ash pond 10. In the alternative, multiple collection systems can be simultaneously installed within the fly ash 12, at successive depths, in which case each successive system is simply removed as it is uncovered. Further details about the arrangements, functions, and benefits of the methods and systems described herein will be appreciated by reference to FIGS. 1-7 in view of the present description.

It will be appreciated that flush water can be treated to enhance the leaching process. For example, when flush water is acidified, pollutants that are more soluble in an acid solution can be more readily leached from the fly ash 12. In this case, de-acidification of the flush water in one or more entrapment ponds can cause pollutants to precipitate out of solution so that they can be more easily entrapped. Other leaching agents can be added to flush water to remove specific pollutants or a liquid other than water can be substituted.

In one embodiment, the fly ash 12 can be agitated to enhance the leaching process. For example, the fly ash 12 can be tilled and then flooded with flush water. In this example, clumps of fly ash 12 can be broken apart to increase surface contact between flush water and fly ash 12 particles to increase the efficiency of the flushing process. In another example, the ash pond 10 can be flooded and the fly ash 12 can then be agitated to create a suspension of ash within the flush water. This latter example can greatly increase surface contact between flush water and fly ash 12 particles, and therefore can even further increase the efficiency of the flushing process. Additionally, as shown in FIG. 3, an evaporation pond 38 or evaporation system 40 can be employed to concentrate pollutants through the process of evaporation.

Effect of a Flush Water Collection System on the Hydrodynamics of an Ash Pond

The collection systems in the embodiments described herein can create a hydrodynamic environment where water tends to migrate into the pond from the surrounding soil, where that water can then be collected and treated; as opposed to a conventional ash pond without a collection system, where water tends to migrate out of the pond and contaminate groundwater. Put another way, while water contained in a conventional ash pond can exert hydrostatic pressure that eventually drives pond water through the pond wall and into groundwater, a collection system within an ash pond as described herein can cause water outside the pond to exert hydrostatic pressure on the outside of the pond wall to drive groundwater through the pond wall and into the pond. It will be appreciated that, as a result, to the extent a breach occurs in a pond wall, it can be less likely that groundwater will be resultantly contaminated if the ash pond includes a collection system in accordance with the present disclosure.

Monitoring Wells and an External Collection System

Figure 7:
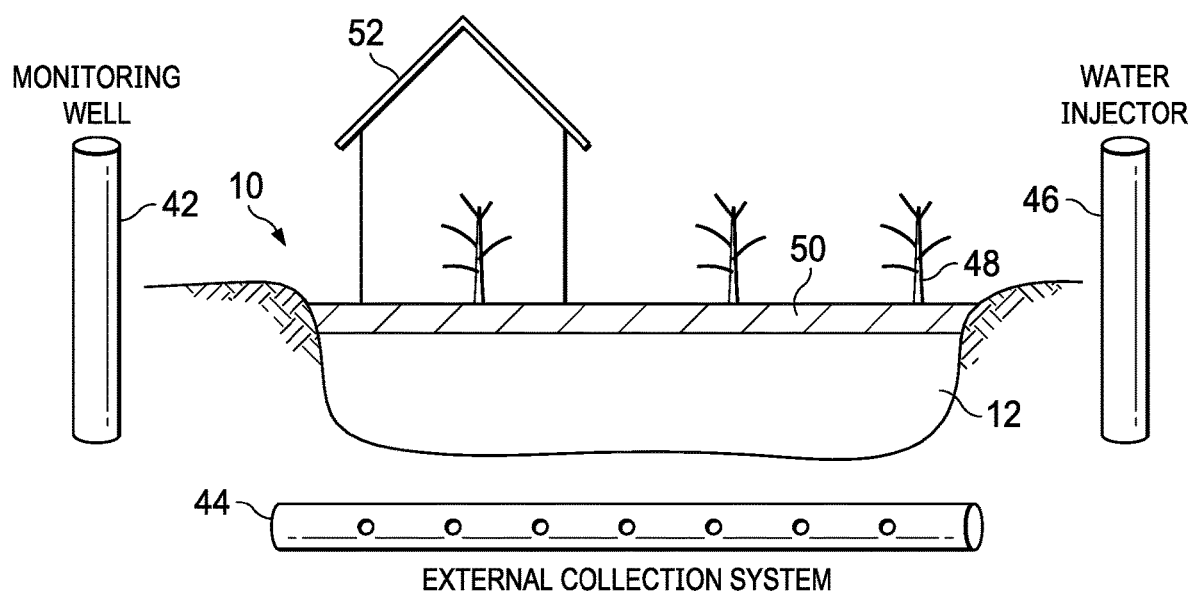
FIG. 7. depicts a system installed adjacent to a fly ash pond comprising a monitoring well, an external ground water collection system, a water injection system, as well as a layer of anthropogenic soil created in the upper layer of fly ash in a fly ash pond in which a phytoremediation cover crop is planted.

In yet another embodiment, as shown in FIG. 7, one or more monitoring wells (e.g., 42) can be installed, such as just outside the perimeter of the ash pond 10, for the purpose of monitoring ground water for contamination. In one example, the monitoring wells 42 can include an external collection system 44 that can be installed around the perimeter of the ash pond for the purpose of collecting groundwater. The external collection system 44 can include a plurality of vertical pipes (monitoring wells can serve as a collection system in this example) and/or a plurality of perforated pipes (e.g., similar to those described above) placed horizontally around the perimeter of the ash pond 10. In these examples, the pipes of the external collection system 44 can extend or be placed below the level where groundwater contamination is suspected or detected, so that gravity will cause groundwater to enter the external collection system 44. The collected groundwater can then be analyzed to detect the presence or absence of pollutants, in order that the integrity and efficacy of the ash pond 10 can be monitored and assessed. In these examples, the collected groundwater can be pumped, or can flow by gravity, to a treatment system designed to entrap pollutants as described above.

If groundwater is severely contaminated, clean water from any available source can be applied upon or injected into the ground using water injectors (e.g., 46) beyond the point where groundwater contamination is detected. Clean water so applied or injected can cause the contaminated groundwater to move toward the external collection system 44 where it is collected and pumped, or flows by gravity, to a treatment system designed to entrap pollutants as described above.

Phytoremediation—Entrapping Pollutants Using a Cover Crop

In one example, referring to FIG. 7, after dewatering and leveling fly ash 12 in the ash pond 10, a suitable phytoremediation cover crop 48 can be planted to entrap trace elements and/or to protect against particulate pollution resulting from wind erosion. The phytoremediation cover crop 48 can be selected based upon based upon its ability to tolerate in a wet environment together with its proclivity to accumulate certain pollutants. Some plant species have a tendency to accumulate specific pollutants while others accumulate multiple pollutants. The particular species can be selected based upon the results of fly ash tests.

Creating the Anthropogenic Soil

Supplemental materials including but not limited to animal manure, wood bi-products, fertilizers and soil can be deposited in a generally uniform layer over the surface of the fly ash 12 in the ash pond 10 to create an anthropogenic soil 50. Supplemental materials can be distributed in dry form using a truck and/or in a slurry using the same pipe and pump system commonly utilized to deliver fly ash slurry to an ash pond 10, or by any other suitable method. The surface layer of fly ash 12 and supplemental materials can be mixed using a crawler or tractor and appropriate tillage tool or other suitable method if more uniformity of the anthropogenic soil 50 is desired.

It will be appreciated that commercial crops can be planted directly in the anthropogenic soil 50 in the ash pond 10, or the anthropogenic soil 50 can be harvested to be sold as potting soil or as a commercial soil amendment. One example of a high value commercial crop is lavender. It will be appreciated that certain crops may be selected based upon their specific resistance to absorbing certain pollutants or other undesired materials from the anthropogenic soil 50 or fly ash 12. Another example of a high value commercial crop is sod which can be harvested together with a thin layer of the anthropogenic soil 50. As the layer of the anthropogenic soil 50 is depleted, either by cropping and/or harvesting and selling the soil, additional layers of the anthropogenic soil 50 can be created by adding supplemental materials, and this cycle can be repeated as long as sufficient fly ash 12 remains.

Greenhouses

It may be desirable to build greenhouses (e.g., 52) over fly ash 12 in the ash pond 10 to take greater advantage of the high productivity of the anthropogenic soil 50 by extending the growing season. Examples of crops that may be grown in greenhouses include tomatoes and other vegetables.

CONCLUSION

The foregoing methods and systems can provide solutions to acute problems recognized herein relating to the United States' dependence upon other countries to supply defense-critical rare-earth elements (REEs) that are essential to many high-tech devices including electronic displays, guidance systems, lasers, and radar and sonar systems. The methods and systems discussed herein can additionally or alternatively provide a flexible and cost effective arrangement for extracting defense-critical REEs within U.S. borders by U.S. controlled companies. In addition, the methods and systems discussed herein can additionally or alternatively provide a flexible and cost effective arrangement for extracting the rare earth element thorium, which can be used as a nuclear fuel in place of uranium.

The foregoing methods and systems can additionally or alternatively provide solutions to current environmental and economic problems recognized herein relating to groundwater contamination and the disposition of coal fly ash. Moreover, the methods and systems disclosed herein can reduce or eliminate the risk of pollutants being released from a landfill containing fly ash. The methods and systems discussed herein can additionally or alternatively provide a flexible and cost effective solution for flushing pollutants from fly ash so that the fly ash can be converted into useful materials having a significant market value, including an anthropogenic soil suited to intensive agricultural applications, construction materials including road fill, and other useful materials, while reducing or eliminating the risk of environmental contamination.

A further advantage of the methods and systems disclosed herein, is that certain valuable materials not specifically discussed herein, that are present in coal fly ash, can be extracted from the fly ash and beneficially used in industry.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A method of processing fly ash, the method comprising:
    burying a collection system beneath a top surface of a fly ash pond, the collection system comprising a plurality of spaced pipes coupled with an outlet, the spaced pipes being configured to facilitate entry of a liquid into the collection system;
    applying a liquid to the top surface of the fly ash pond, above the spaced pipes, such that the liquid:
        percolates through the fly ash pond while leaching materials from fly ash within the fly ash pond; and
        flows, carrying the leached materials, into the spaced pipes, through the spaced pipes toward the outlet, and from the outlet into a reservoir;
    collecting in the reservoir the liquid and the leached materials received from the outlet; and
    extracting at least some of the leached materials from the liquid collected in the reservoir.

2. The method of claim 1 wherein at least some of the spaced pipes are placed in a horizontal orientation.

3. The method of claim 1 wherein at least some of the spaced pipes are placed in a vertical orientation.

4. The method of claim 1 wherein the liquid is an aqueous solution.

5. The method of claim 1 wherein the liquid consists of water.

6. The method of claim 1 wherein the liquid is a non-aqueous solution.

7. The method of claim 1 further comprising treating the liquid to enhance the leaching process.

8. The method of claim 1 further comprising treating the fly ash to enhance the leaching process.

9. The method of claim 1 further comprising agitating the fly ash in the fly ash pond to enhance the leaching process.

10. The method of claim 1 wherein the liquid flows through the spaced pipes toward the outlet by gravity.

11. The method of claim 1 further comprising pumping the liquid through the spaced pipes toward the outlet.

12. The method of claim 1 wherein the liquid flows from the outlet into the reservoir by gravity.

13. The method of claim 1 further comprising pumping the liquid from the outlet into the reservoir.

14. The method of claim 1 wherein the liquid enters the collection system through perforations in the spaced pipes.

15. The method of claim 1 wherein at least some of the spaced pipes are wrapped with a filter material.

16. The method of claim 1 wherein, following extraction of at least some of the leached materials from the liquid collected in the reservoir, re-applying at least some of the liquid collected in the reservoir to the top surface of the fly ash pond to facilitate further leaching of materials from the fly ash pond.

17. The method of claim 16 further comprising pumping the at least some of the liquid collected in the reservoir through a pipe to facilitate re-application thereof to the top surface of the fly ash pond.

18. The method of claim 1 further comprising sourcing at least some of the applied liquid from a well or a pond.

19. The method of claim 1 wherein the applied liquid is rainwater.

20. The method of claim 1 wherein:
    the fly ash pond resides in an area having been excavated from surrounding topography;
    the fly ash pond is bowl shaped;
    the fly ash had derived from the burning of coal; and
    the fly ash pond comprises a liner configured to contain the liquid within the fly ash pond except to the extent released through the outlet into the reservoir.

21. The method of claim 1 wherein the spaced pipes are circular in cross section.

22. The method of claim 21 wherein the spaced pipes are corrugated.

23. The method of claim 20 wherein the fly ash pond is impounded by a dam.

24. The method of claim 1 wherein at least some of the spaced pipes are placed in a horizontal orientation at a slope.

* * * * *